United States Patent
Khawand et al.

(10) Patent No.: US 7,447,735 B2
(45) Date of Patent: Nov. 4, 2008

(54) INTERPROCESSOR COMMUNICATION PROTOCOL

(75) Inventors: Charbel Khawand, Miami, FL (US); Jean Khawand, Miami, FL (US); Chin P. Wong, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 920 days.

(21) Appl. No.: 10/610,746

(22) Filed: Jul. 1, 2003

(65) Prior Publication Data

US 2005/0027904 A1 Feb. 3, 2005

(51) Int. Cl.
*G06F 15/16* (2006.01)
(52) U.S. Cl. .................... 709/203; 709/213; 709/227; 709/230; 709/238; 719/312; 719/319
(58) Field of Classification Search .................. 709/203, 709/213, 227, 230, 238; 719/312, 319
See application file for complete search history.

(56) References Cited

U.S. PATENT DOCUMENTS

| | | | |
|---|---|---|---|
| 5,619,697 A * | 4/1997 | Nishida ...................... 719/313 |
| 5,623,605 A * | 4/1997 | Keshav et al. ................ 709/236 |
| 5,848,145 A | 12/1998 | Gallagher et al. |
| 5,867,656 A | 2/1999 | Iwasaki et al. |
| 6,510,465 B1 | 1/2003 | Bilansky et al. |
| 6,996,823 B1 * | 2/2006 | Basso et al. .................. 719/313 |
| 7,263,701 B2 * | 8/2007 | Yun ............................ 719/313 |
| 2003/0120782 A1 * | 6/2003 | Bortoloso et al. ........... 709/227 |
| 2003/0204590 A1 * | 10/2003 | Torii ........................... 709/224 |

OTHER PUBLICATIONS

"Intel 440EX AGpset: 82443EX PCI AGP Controller (PAC)" Datasheet, Apr. 1998.
"OMAP Processors for Wireless Devices." Texas Instruments.

* cited by examiner

*Primary Examiner*—Saleh Najjar
*Assistant Examiner*—Shawki S Ismail

(57) ABSTRACT

An InterProcessor Communication (IPC) Protocol network (100) includes at least one IPC client (102) and an IPC server (108). The IPC protocol allows for the IPC client (102) to register with the IPC server (108) which will provide the means for the two to communicate freely without any limitations on what software architectures, operating systems, hardware, etc. each depend on. The IPC protocol in one embodiment of the invention provides for dynamic IPC node configuration in a server based IPC communication management framework.

19 Claims, 7 Drawing Sheets

INTERPROCESSOR COMMUNICATION PROTOCOL

TECHNICAL FIELD

This invention relates in general to the field of electronics, and more specifically to an InterProcessor Communication (IPC) protocol/network.

BACKGROUND

Most electronic systems include a number of networked elements (components) such as hardware and software that form the system. In most systems there is a layer resposible for communication between the different components that form a networked element as well as between the different networked elements themselves. This layer is typically referred to as the InterProcessor Communication (IPC) layer.

Several protocols have been introduced in the last few years to deal with interprocessor communications. One example of an IPC product is PCI AGP Controller (PAC) that integrates a Host-to-PCI bridge, Dynamic Random Access Memory (DRAM) controller and data path and an Accelerated Graphics Port (AGP) interface. Another example of an IPC product is the OMAP™ platforms. Neither of these platforms provides much if any support above the hardware level and provides little design flexibility at the lower level component or channel levels (physical layer).

The PAC platforms for example, are closed architectures and are embedded into the Operating System's TAPI layer, with the IPC code not being accessible to developers. Therefore, these platforms do not extend to the component levels they also do not allow for dynamic assignment of IPC resources, hardware support capabilities, or multi-node routing, etc. as well as not allowing for the dynamic assignment of the IPC resources. Given the above, a need thus exists in the art for an IPC protocol that can provide a solution to some of these shortcomings in the prior art.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION OF THE PREFERRED EMBODIMENT

Figure 1:
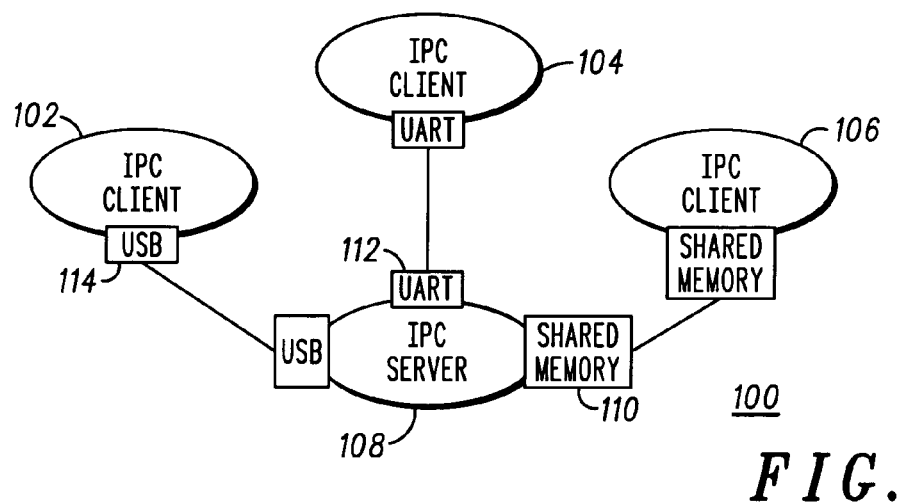
FIG. 1 shows a diagram of an IPC network in accordance with an embodiment of the invention.

While the specification concludes with claims defining the features of the invention that are regarded as novel, it is believed that the invention will be better understood from a consideration of the following description in conjunction with the drawing figures.

The IPC of the present invention provides the support needed for different processors operating in a system to communicate with each other. For example, in a dual processor (or multi-processor) radio architecture for use in a radio communication device that includes an Application Processor (AP) and a Baseband Processor (BP), the IPC provides the support needed for the processors to communicate with each other in an efficient manner. The IPC provides this support without imposing any constrains on the design of the AP or BP.

The IPC allows any processor that adopts the IPC as its inter-processor communication stack to co-exist together and operate as if the two were actually running on the same processor core sharing a common operating system and memory. With the use of multiple processors in communication devices becoming the norm, the IPC of the present invention provides for reliable communications between the different processors.

The IPC hardware provides the physical connection that ties together the different processors to the IPC network. Data packets are preferably transported between the different hosts asynchronously in one embodiment of the invention. Processors that are connected to the IPC network have their physical and logical addresses statistically or dynamically assigned (e.g., IPC addresses). Also, since data packets can flow in any direction within the IPC network in one embodiment of the invention, they need to carry a destination address of the processor that they are trying to reach. Packets are also preferably checked for errors using conventional Cyclic Redundancy Check (CRC) techniques. Although the network activities of the IPC network of the present invention may have some similarities to those found on an Internet network that uses IP transport layers such as a Transmission Control Protocol/Internet Protocol (TCP/IP) network, the IPC of the present invention is not divided into smaller networks with gateways as in a TCP/IP network.

Referring now to FIG. 1, there is shown an IPC network 100 in accordance with an embodiment of the invention. The IPC network 100 includes a plurality of IPC clients 102-106, and an IPC server 108 coupled to the IPC clients 102-106 using different IPC physical links such as shared memory 110, Universal Asynchronous Receiver/Transmitter (UART) 112 and Universal Serial Bus (USB) 114 as some illustrative examples. It should be noted that with the IPC of the present invention, an IPC client 102-106 can negotiate with the current IPC server 108 to switch roles. If an IPC client 102-106 negotiates to become the IPC server and becomes the new IPC server, all of the remaining IPC clients are instructed to change the IP address of the server given the change in the IPC server.

Figure 2:
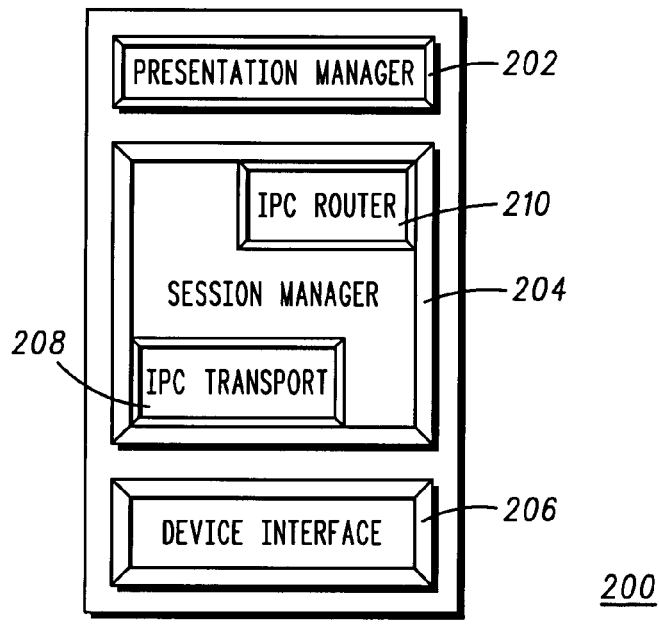
FIG. 2 shows an IPC stack in accordance with an embodiment of the invention.

In FIG. 2, there is shown an IPC stack 200 of an IPC server 108 (or IPC clients 102-108) in accordance with an embodiment the present invention. The IPC stack 200 is designed to be integrated under an Operating System (OS) and to provide support for the inter-processor communication needs of component traffic. The IPC stack is composed of the following 3 main layers:

(1). IPC Presentation Manager (202)—this layer is used to translate different data types between different system components (e.g., software threads).

(2). IPC Session Manager (204)—this layer is a central repository for all incoming/outgoing IPC traffic between the IPC stack and all of the system components. The IPC session manager 204 has several functions: assignment of component IDs for participating IPC components; deciding if the IPC data needs to be encapsulated; routing of IPC data, termination of IPC traffic; place holder for IPC processors; providing IPC addresses, assigning and authenticating IPC clients, etc.

IPC Transport Layer (208)—located within the IPC session manager (layer) 204, the IPC transport layer 208 provides a very basic cyclic redundancy check for the purpose of transporting the IPC data between the different processors. In addition, the IPC transport layer 208 is responsible for routing IPC messages to their final destinations on the IPC network 100. The routing function of the transport layer is enabled only on IPC servers.

IPC Router Block (210)—transports the IPC data to a destination component (not shown). Incoming IPC messages carry among other things, the originator component ID, the IPC message opcodes such as Audio and Modem. Note that in accordance with an embodiment of the invention, a unique opcode is assigned to each component/software thread (see for example 502 in FIG. 5), such as Audio and Modem that is coupled to the IPC network. The IPC session manager 204 relies on the router block 210 to send the IPC data to the right component(s).

(3). Device Interface Layer (206)—is responsible for managing the IPC physical-to-logical IPC channels. Its main function is to abstract the IPC hardware completely so that the stack IPC becomes hardware independent. The device interface layer 206 manages the physical bandwidth of the IPC link underneath to support all of the IPC logical channels. In the incoming path, the device interface layer 206 picks up data from different physical channels 110-114 and passes them up to the rest of the IPC stack. On the outgoing path, the device interface layer 206 manages the data loading of the IPC logical channels by sending them onto the appropriate physical channels. The device interface layer 206 also handles concatenating IPC packets belonging to the same IPC channel before sending them to the IPC hardware. Channel requirements are pre-negotiated between the IPC session manager 204 and the IPC device interface layer 206. The device interface layer 206 provides for hardware ports, which in turn provide a device interface to an IPC client 102-106.

Figure 3:
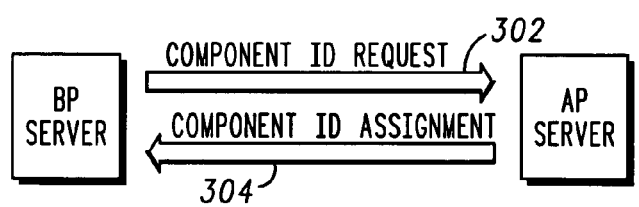
FIG. 3 shows an IPC component IPC assignment in accordance with an embodiment of the invention.

Referring to FIG. 3 there is shown an IPC component ID assignment routine. Any new component wishing to participate in an IPC communication must do so by first requesting an IPC Identification Number (ID) in step 302 from its IPC session manager (e.g., like session manager 204). The local session manager (e.g., session manager located in client that the component is coupled to) will then alert the IPC server's session manager of the new IPC components and a component ID assignment will be provided in step 304. In accordance with an embodiment of the invention, the component IDs are dynamic and can be reassigned by the session manager (e.g., the server's session manager). The main IPC server location will most likely be on the main AP. Each IPC node will preferably have a unique IPC node ID and the session manager will keep in its database the following information for each participating IPC node:

IPC Node Type: For example, a particular BP or AP, a Wireless Local Area Network (WLAN) AP, etc.

IPC address: The IPC address of the IPC node.

Data Type: The data type of the IPC node.

Opcode list: This is a list of all the IPC message opcodes that the components have subscribed to.

Component IDs: List of all the component IDs.

Figure 4:
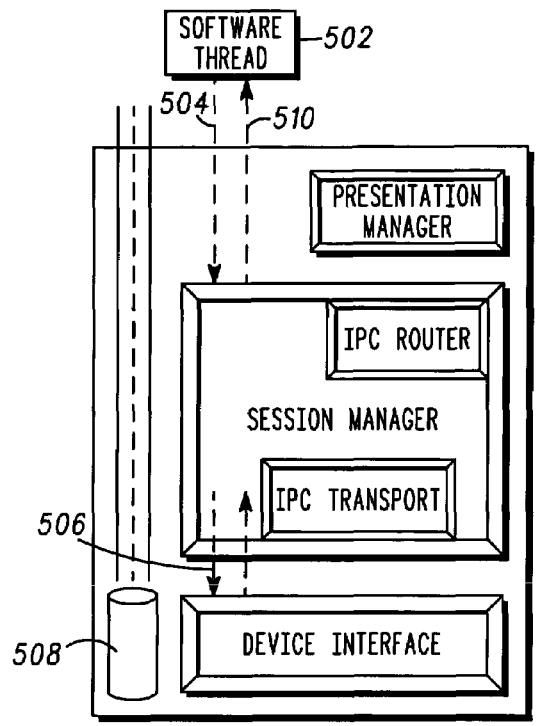
FIG. 4 shows the main IPC tables in accordance with an embodiment of the invention.

Referring now to FIG. 4, there is shown an IPC stack along with all of the main IPC tables. The Dynamic routing table 402 includes the Node Type, IPC address/Port # information, Data Type and Subscription list. The component routing table 404 includes the information linking the Opcode information and all of the components subscribed to each particular Opcode. Finally, the Channel Resource table 406 includes a linking of each Channel ID with a list of physical channel IDs.

Figure 5:
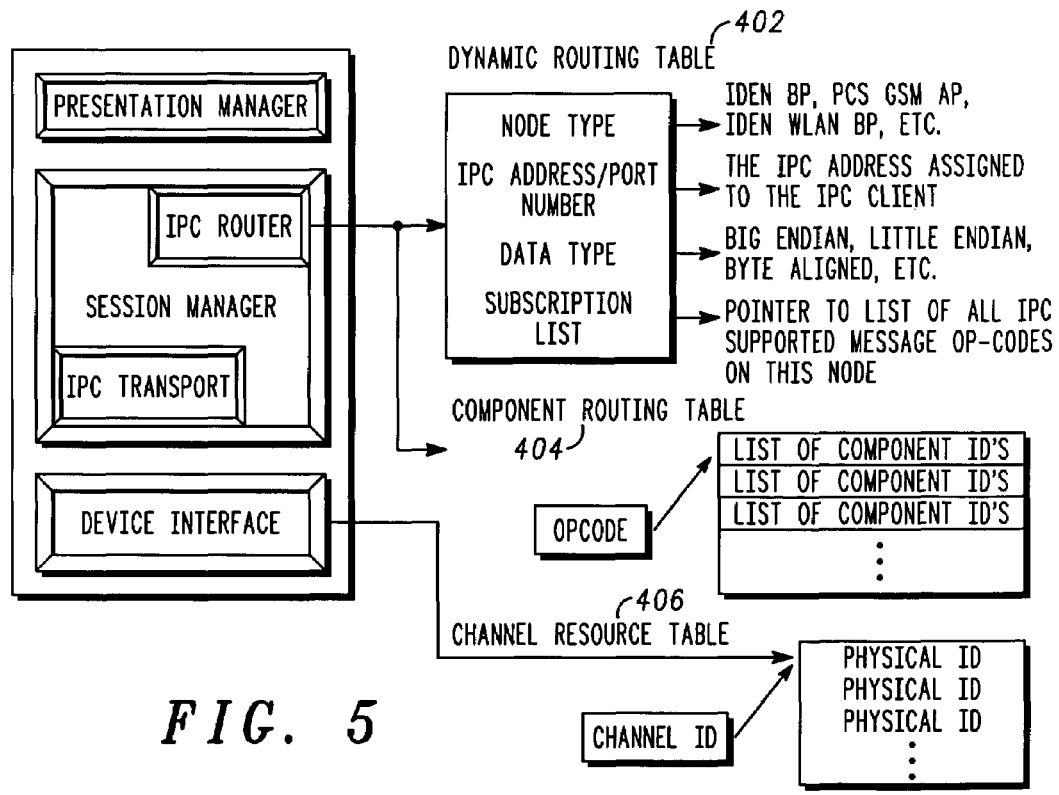
FIG. 5 shows a diagram showing channel allocation in accordance with an embodiment of the invention.

In FIG. 5, there is shown a block diagram of how the IPC stack in accordance with an embodiment of the invention, provides an IPC channel for a component such as a software thread (e.g., Audio, etc.). Component 502 first requests an IPC channel in step 504. The session manager shown in FIG. 5, negotiates the component's request with the Device Layer in step 506 using a defined API. The Device layer (Device Interface) then requests hardware resources, such as a data channel 508. The session manager shown in FIG. 5 in response to the request, grants an IPC channel to the requester in step 510. The component 502 next sends its data on the assigned channel 508. The device layer then forwards the data to the IPC network. The mapping of the logical to physical channel IDs is the function of the IPC device interface.

Figure 6:
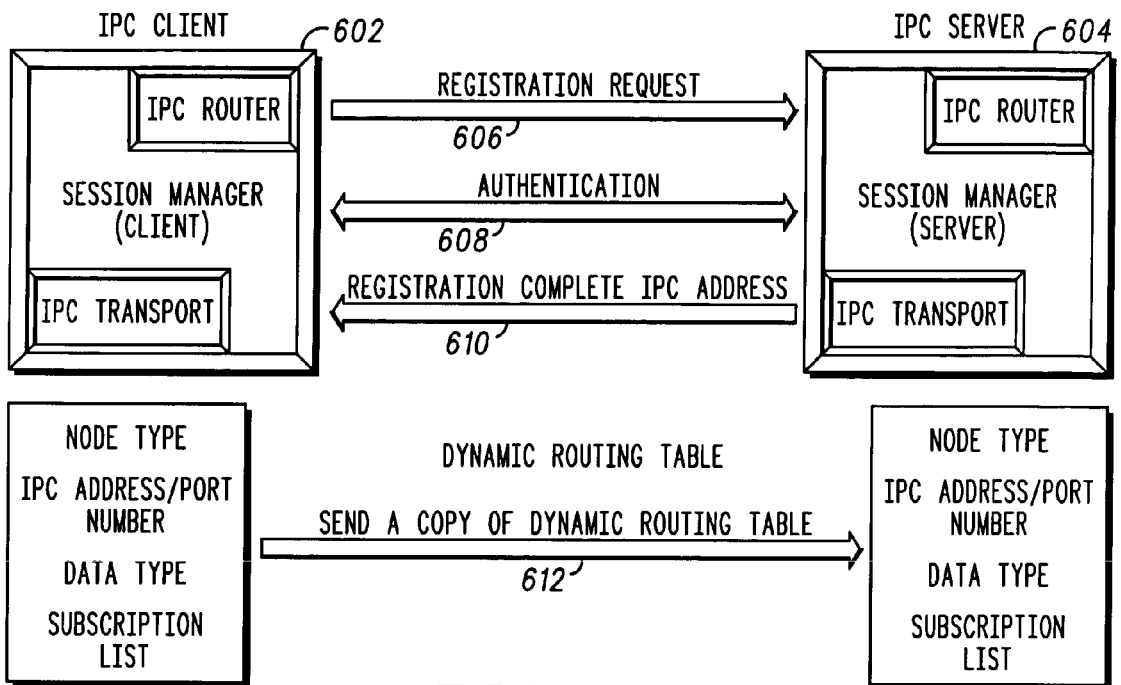
FIG. 6 shows a diagram highlighting the steps involved during an IPC client initialization routine in accordance with an embodiment of the invention.

Referring now to FIG. 6, the first step in IPC client initialization is sending a registration request (step 606) between the IPC client 602 and the IPC server 604. The IPC server 604 then authenticates the request with the IPC client 602 in step 608. This is followed by sending an IPC address to the IPC client and completing the registration in step 610. The IPC client's session manger sends a copy of its dynamic routing table to the IPC server in step 612.

Figure 7:
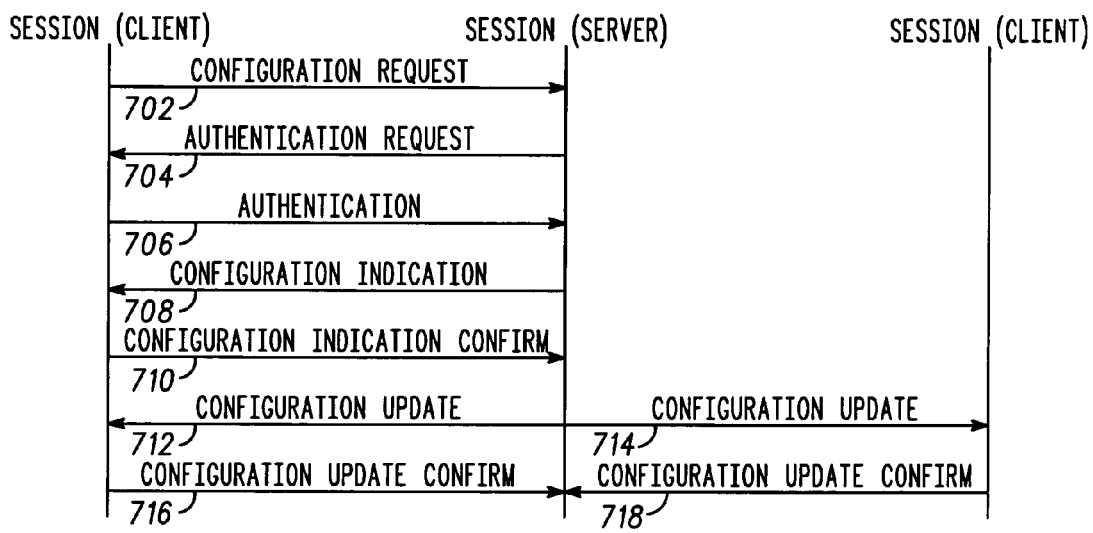
FIG. 7 shows another diagram highlighting the steps involved during an IPC client initialization in accordance with an embodiment of the invention.

More detailed steps taken during the IPC client initialization process are shown in FIG. 7. The client session manager (shown in table as Session (client)) sends a configuration request to the IPC server's session manager (shown in table as Session (Server)) in step 702. In step 704, authentication is requested by the IPC server's session manager. Authentication between the IPC client and IPC server is then carried out in step 706.

The parameters in the configuration request include the node type and the data type. The session server in response to the configuration request in step 702 assigns the requestor an IPC address. It also sets up a dynamic routing table for the requester if one does not exist. It then sends the requester a configuration indication as in step 708. The configuration indication parameters include the IPC address of the server and the newly assigned IPC address of the client.

In response to receiving the configuration indication, components attached to the session client can request control/data from the client's session manager. The Session client then sends a configuration indication confirm message to the session server in step 710. The "configuration indication confirm" message has no parameters, upon receiving the configuration indication confirm message in step 710, the session server can initiate IPC streams to the newly configured session client. The session server then sends configuration update messages to the session clients in steps 712 and 714. This causes the both session clients shown in FIG. 7 to update their respective dynamic routing tables (not shown) and send a configuration update confirm message to the session server in steps 716 and 718. Upon receiving the configuration update confirm messages, the session server makes sure all of the IPC participants have been updated.

When a packet is received by an IPC session manager, it comes in the form of data that includes the source component ID, the destination ID, a channel ID and the type of BP or AP. The IPC session manager will add the destination component ID in the event that the destination ID is not inserted. The IPC session manager will also insert an IPC address. It is the IPC session manager that discovers the destination ID based on the message opcode received. The destination ID is based on a lookup table. This lookup table is updated dynamically each time a component subscribes to a new IPC message opcode (e.g., an audio component subscribes to audio messages by sending a request to the IPC session manager).

Figure 8:
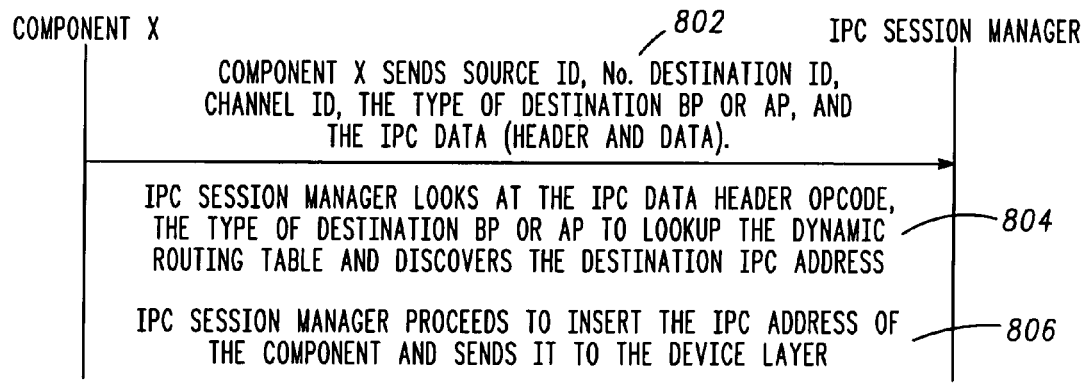
FIG. 8 shows a diagram highlighting the first level of IPC encapsulation in accordance with an embodiment of the invention.

In FIG. 8 there is shown a sequence of events during a general destination ID discovery sequence between a component and its IPC session manager in accordance with an embodiment of the invention. In step 802, the component sends its source ID (but no destination ID), the type of the destination BP or AP and the IPC data which includes a header and data. In step 804, the IPC session manager looks at the IPC data header opcode and the type of destination BP or AP, in order to lookup the corresponding dynamic routing table and find the correct destination address. In step 806, the IPC session manager inserts the IPC address of the component and sends it down to the device layer.

Figure 9:
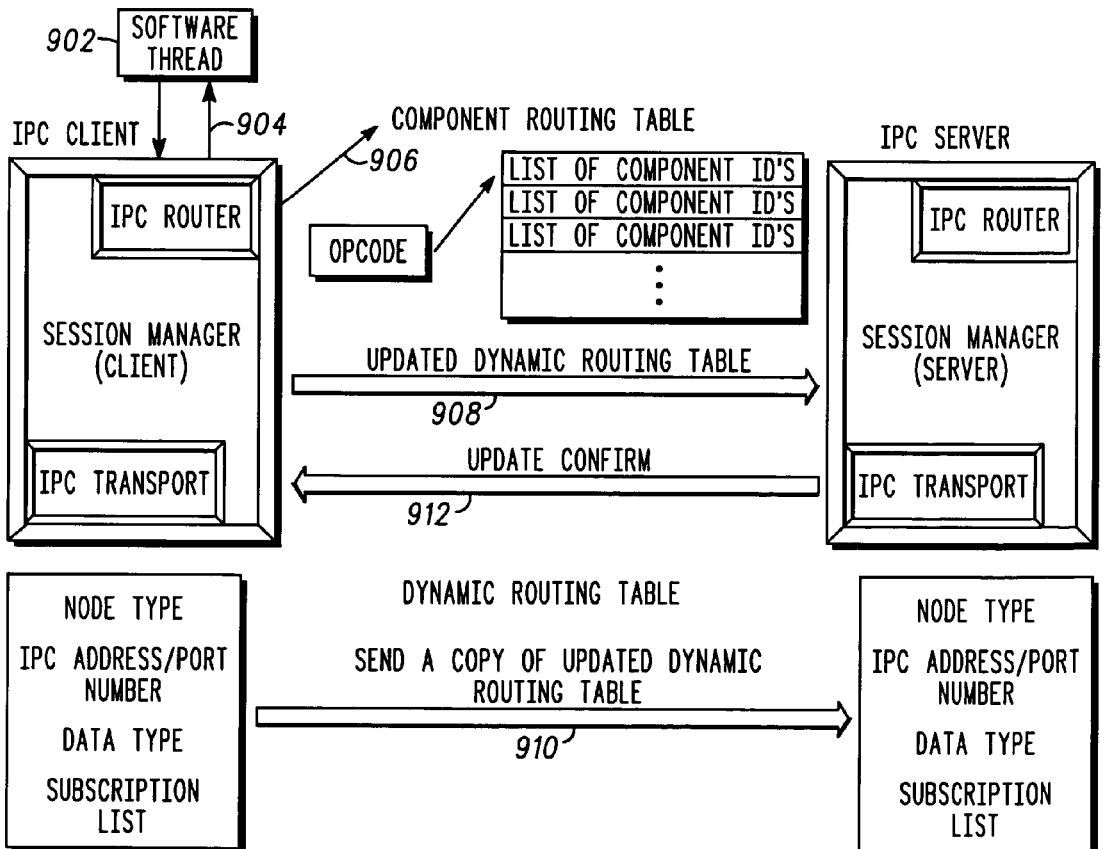
FIG. 9 shows a diagram highlighting the steps taken during IPC component initialization in accordance with an embodiment of the invention.

In FIG. 9, typical steps taken during an IPC component initialization are shown. Once the BP has been configured by the IPC server shown in FIG. 9, it allows components such as component 902 to subscribe to different services. Components will subscribe themselves to functions such as Audio, Video, etc. in step 904. The component subscription information is then sent to the IPC session manager for component ID creations (if an ID is not assigned yet) and creation or updating of the dynamic routing table for a particular IPC address (step 906). In step 908, the session manager updates the IPC server with the information from step 906. A confirmation of the dynamic routing table is sent in step 912 by the IPC server to the IPC client. Once the server is alerted, new dynamic routing table updates are broadcast to all participating processors in step 910.

Figure 10:
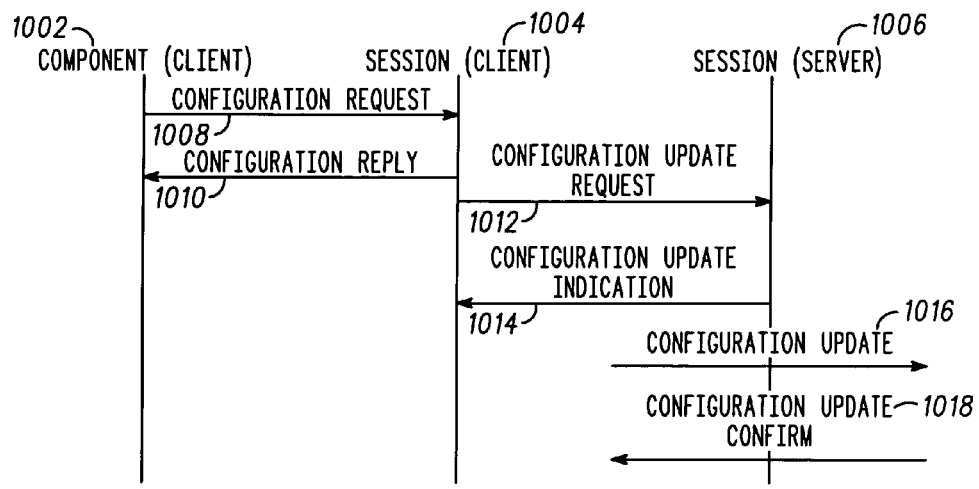
FIG. 10 shows a chart highlighting the steps taken during component initialization in accordance with an embodiment of the invention.

The same component initialization process is shown between a component (client) 1002, a session (client) also known as a client session manager 1004 and the session (server) also known as the server session manager 1006 in FIG. 10. A component configuration request in step 1008 is sent by the component (client) 1002. In response to the request, the client session manager 1004 negotiates a logical channel with its device layer (not shown). The client session manager 1004 also assigns a component ID and adds the new opcode list to its dynamic routing table (not shown). In step 1010, the client session manager 1004 sends a configuration reply which includes the component ID and the channel ID as parameters. In response to the configuration reply, the component (client) 1002 receives its ID and channel ID from the client's session manager 1004.

Once the client session manager 1004 replies in step 1010 to the configuration request in step 1008, the client session manager 1004 sends a configuration update request in step 1012 to the session server 1006. The parameters for the configuration update request are any new changes that have been made in the dynamic routing table. The session manager updates the dynamic routing table for that IPC address. The server session manager 1006 in step 1016 then sends all the IPC clients a configuration update, while it sends the IPC client a configuration update indication in step 1014. The server's session manager 1006 makes sure the IPC server has updated its routing table with the changes that were sent.

In the configuration update message of step 1016 which includes the dynamic routing tables as a parameter(s), the session server 1006 updates the dynamic routing tables and sends a configuration update confirm message in step 1018. The session server 1006 then makes sure all of the IPC participants have been updated.

The IPC session manager determines the routing path of incoming and outgoing IPC packets. The route of an outgoing packet is determined by the component's IPC address. If the destination address is found to be that of a local processor, a mapping of the IPC to the Operating System (OS) is carried out within the session manager. If the destination address is found to be for a local IPC client, the packet is sent to the IPC stack for further processing (e.g., encapsulation). Note that if the destination component is located on the same processor as the component sending the IPC packet, no encapsulation is required and the packet gets passed over through the normal OS message calling (e.g., Microsoft Message Queue, etc.). In this way components do not have to worry about modifying their message input schemes. They only need to change their message posting methodologies from an OS specific design to an IPC call instead.

For incoming packets, if the destination address of the message is not equal to the IPC server's, the incoming packets gets routed to the proper IPC client. The routing of incoming packets is handled by the session manager of the IPC server. Otherwise, the message is forwarded to the right component or components depending on whether or not the component destination ID is set to a valid component ID or to 0×FF.

The IPC router block transports the IPC data to the destination component. Incoming IPC messages carry among other things, the originator component ID and the IPC message opcodes such as those for Audio, Modem, etc. The IPC session manager relies on its component routing table to send the IPC data to the right component(s). Both the dynamic routing table and the component routing table are updated by the IPC server/client.

During power-up, each component must register itself with its session manager to obtain an IPC component ID. In addition, it must also subscribe to incoming IPC messages such as Audio, Modem, etc. This information is stored in the component routing table for use by the IPC session manager.

Figure 11:
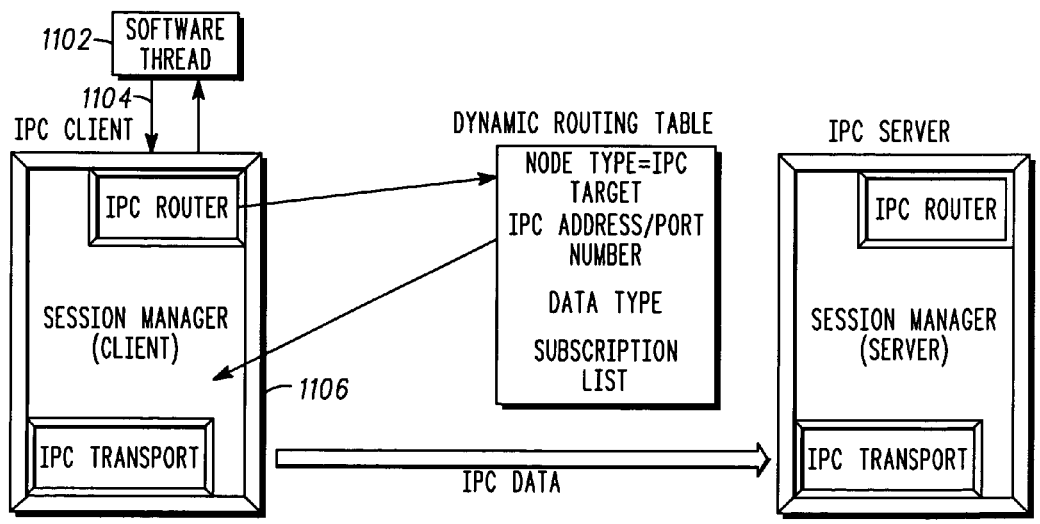
FIG. 11 shows the transfer of IPC data between an IPC client and an IPC server in accordance with an embodiment of the invention.

When a component 1102, as shown in FIG. 11, sends its data request to the IPC session manager as in step 1104, a check is made on the destination IPC node (e.g., the BP). If the IPC node does not support the IPC message opcode, an error reply is returned to the component 1102. In addition to the error reply, the IPC session manager returns an update of all the IPC nodes that are capable of receiving that particular opcode. It is up to the component to decide to which of the IPC node(s) it will redirect the message. The IPC session manager 1106 will proceed to encapsulate the data with the IPC header information before the data is sent on the IPC network if the session manager determines that the destination component is located in the IPC network but not in the local processor.

Figure 12:
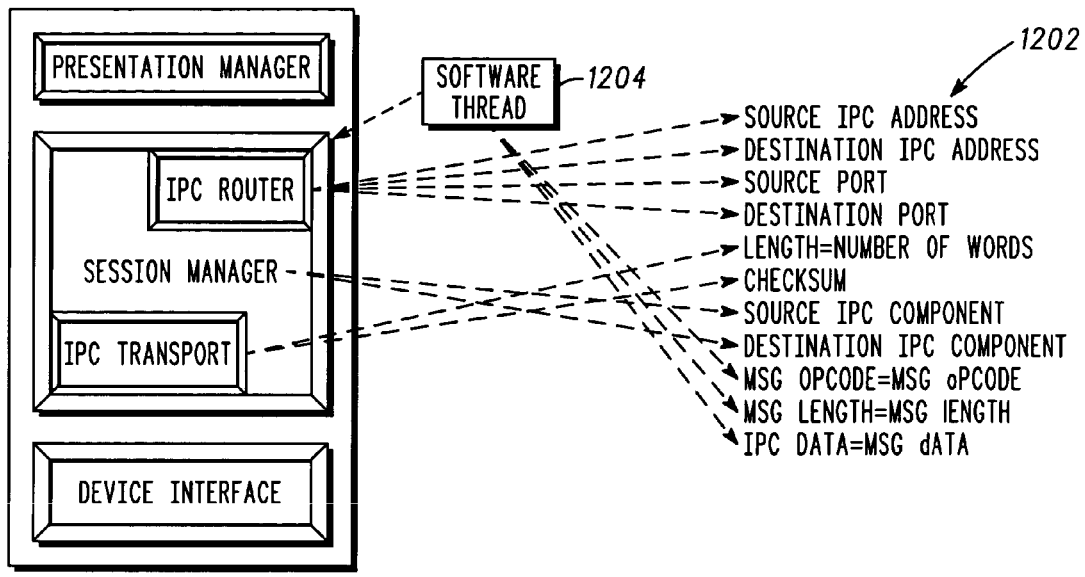
FIG. 12 shows a diagram of an IPC data header in accordance with an embodiment of the invention.

In FIG. 12, there is shown an IPC data header 1202 in accordance with an embodiment of the invention. The header includes the source and destination IPC addresses, source port, destination port provided by the IPC router, the Length and checksum information provided by the IPC transport and the source IPC component and Destination IPC component provided by the session manager. The Message opcode, message length and IPC data are provided by the component 1204.

Figure 13:
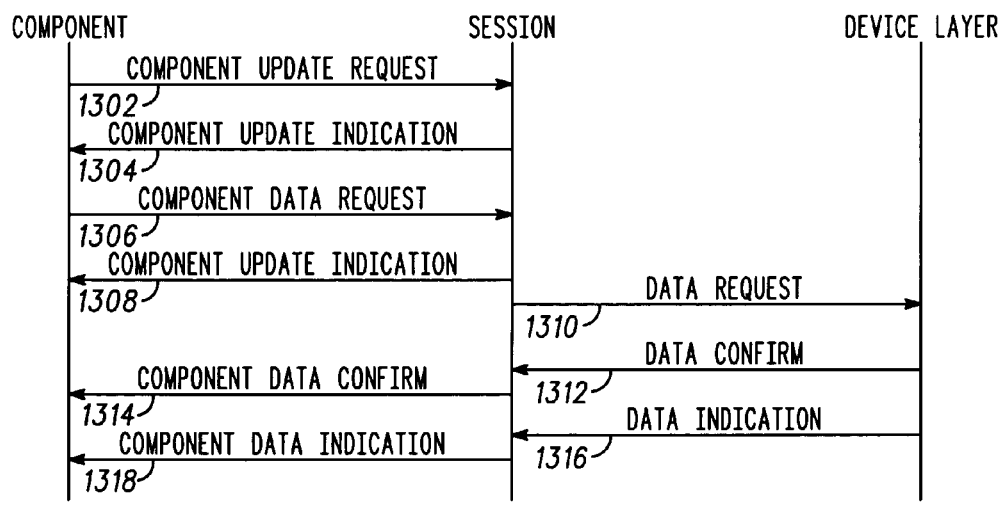
FIG. 13 shows a diagram of the steps taken during an IPC data request in accordance with an embodiment of the invention.

A typical IPC data request in accordance with an embodiment of the invention is shown in FIG. 13. In step 1302, the component sends an update request. The component update parameters preferably include the node type and opcode. The component searches for Node types that support its destination opcode. If the Node type is equal to 0×FF, the session manager proceeds to send the component information to all the node tables for all IPC participants. If the opcode field is equal to 0×FF, the session manager proceeds to send the component the opcode list belonging to the specified Node type. On the other hand, if the opcode has a specific value, the session manager proceeds to send the component a true or false value corresponding to whether the Node type supports or does not support that particular opcode.

In step 1304, the component update indication is sent to the component. If the node type is equal to 0×FF, the node tables are returned to the component. If the opcode field is equal to 0×FF, the list of opcodes is returned to the component. However, if the opcode is a specific value, a true or false message is returned. In step 1306, a component data request is made. The parameters for the component data request include the node type, the IPC message opcode, the IPC message data, the channel ID and the component ID. In a component data request, the session manager checks the node type to determine whether the opcode is supported. If the node type does not support the opcode, a component update indication is sent in step 1308. If however, the node type supports the opcode, a data request is sent to the device layer in step 1310. The data request parameters include the IPC message, the channel ID and the IPC header.

The device layer schedules to send the data request message based on the channel ID. The device layer selects the IPC hardware based on the port # header information. Once the data is committed, a data confirm message is sent to the session manager in 1312. In step 1314, the session manager proceeds to send a component data confirm message to the component. The component can wait for the confirmation before sending more IPC messages. Once a data confirm is received, the component can proceed to send the next IPC message.

In step 1316, the device layer sends a data indication message including IPC message data and an IPC header. The session manager checks the destination IPC header of the message, and if different from the local IPC address, the session manager sends (routes) the message to the right IPC node. In step 1310, the session manager sends a data request to the device layer with a reserved channel ID. The session manager checks the destination component ID, and if it is equal to 0×FF, routes the message to all the components subscribed to that opcode. In step 1318, the session manager sends a component data indication message and the component receives the IPC data.

The IPC stack uses a reserved control channel for communication purposes between all participating IPC nodes. On power-up, the IPC server's session manager uses this link to broadcast messages to IPC clients and vice versa. During normal operations, this control channel is used to carry control information between all APs and BPs.

Figure 14:
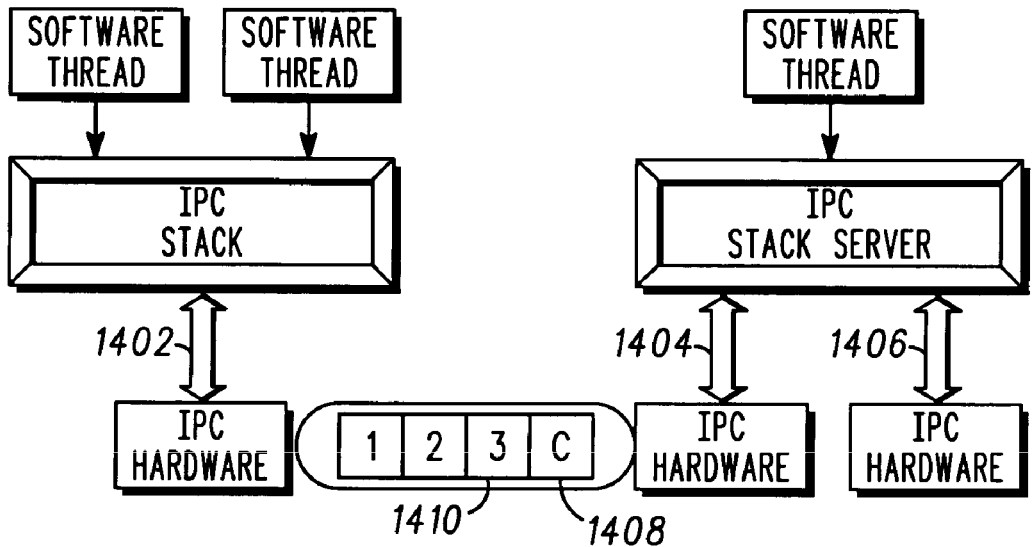
FIG. 14 shows an IPC network in accordance with an embodiment of the invention.

In FIG. 14, there is shown the control channels 1402-1406 located between the IPC stacks and the IPC hardware. Control channel information 1408 is also transmitted along with data packets 1410 when sending data between different IPC hardware. An IPC client broadcasts its configuration request initially on the IPC control channel. The IPC server receives the broadcast and responds with an IPC address for that client. This IPC address becomes associated with the dynamic routing table for that particular processor (AP or BP).

IPC Application Program Interfaces (APIs)

Below are listed some of the APIs for the IPC protocol of the present invention.

1). Component Interface to the IPC Session Manager:

CreateComponentInst( )

Creates a component database in the IPC session manager. Information such as component data types (Big Endian vs. little Endian) and subscription to message opcodes are used in the dynamic data routing table belonging to an IPC address.

OpenChannelKeep( )

Open an IPC channel and if one is available, a Channel-Grant( ) is issued. The channel is reserved until a CloseChannel( ) is issued. Components send QoS requests to the IPC session Manager. The IPC channel assigns a component ID if one is not yet assigned (e.g.ChannelGrant( )).

OpenChannel( )

Open an IPC channel and if one is available, a Channel-Grant( ) is issued. The parameters are the same used for the OpenChannelKeep( ) primitive.

OpenChannelWThru( )

Open an IPC channel and if one is available, a Channel-Grant( ) is issued. This is a request for a write thru channel signifying that encapsulation be turned off on this channel (e.g. Non UDP AT commands).

CloseChannel( )

Request that an IPC channel be closed. The Component no longer needs the channel. The resources are then freed.

ChannelGrant( )

A channel is granted to the requester. The Channel IDs are assigned by the IPC session manager if one is not yet assigned.

ChannelError( )

A channel error has occurred. The channel is closed and the requester is notified.

ChannelDataIndication( )

The requestor is alerted that data on a channel is to be delivered. This message is sent by the IPC presentation manager to the target component. This also includes control channel data.

DataChannelRequest( )

The requestor wants to send data on an opened channel. This also includes control channel data.

ChannelClose( )

Request that an IPC channel be closed. A channel inactivity timer expired and the Channel associated with the timeout is closed. This could also be due to channel error.

2). IPC Session Manager to/from IPC Device Interface

OpenChannel( )

Open a logical IPC channel and if one is available, a ChannelGrant( ) is issued.

The IPC session manager sends channel priority requests to the IPC device interface manager.
CloseChannel( )
Request that an IPC logical channel be closed. A component decides that it no longer requires the channel.
ChannelGrant( )
A logical channel is granted to the requestor.
ChannelError( )
A channel error has occurred (e.g. CRC failure on incoming data or physical channel failure).
ChannelDataIndication( )
The requestor is alerted that data on a channel is to be delivered.
DataChannelRequest( )
The requestor wants to send data on the logical channel.
ChannelClose( )
Request that an IPC channel be closed. A channel inactivity timer expired and the Channel associated with the timeout is closed. This could also be due to channel error.
3). IPC session manager to IPC presentation manager
ChannelDataIndication( )
The requestor is alerted that data on a channel is to be delivered. The information is to be forwarded to the target component with the correct data format.
4). IPC Hardware/IPC Stack Interface
OpenChannel( )
Open a physical IPC channel and if one is available, a ChannelGrant( ) is issued. The IPC session manager sends channel priority requests to the IPC Hardware.
CloseChannel( )
Request that an IPC physical channel be closed. The component no longer requires the channel.
ChannelGrant( )
A physical channel is granted to the requester.
ChannelError( )
A channel error has occurred (e.g. CRC failure on incoming data or physical channel failure).
ChannelDataIndication( )
The requestor is alerted that data on a channel is to be delivered.
DataChannelRequest( )
The requester wants to send data on the physical channel.
ChannelClose( )
Request that an IPC channel be closed. A channel inactivity timer expired and the Channel associated with the timeout is closed. This could also be due to channel error.

Figure 15:
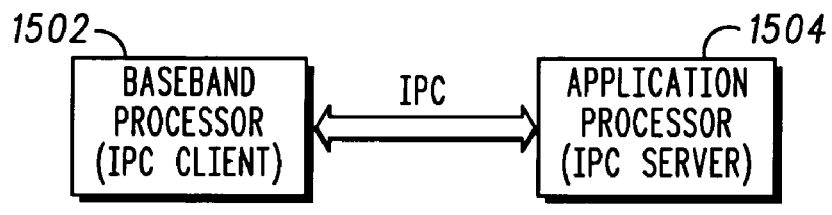
FIG. 15 shows an electronic device such as a radio communication device in accordance with an embodiment of the invention.

In FIG. 15, there is shown a block diagram of an electronic device such as a radio communication device (e.g., cellular telephone, etc.) 1500 having a baseband processor (BP) 1502 and an application processor (AP) 1504 communicating with each other using an IPC network. The IPC protocol of the present invention provides for communications between multiple processors in a system such as a communication device The IPC allows for a Mobile Application (MA) client (e.g., iDEN™ WLAN) to register with a MA server such as a Personal Communication System (PCS) application, and will provide the means for the two MAs to communicate freely without any limitations on what software architectures, operating systems, hardware, etc. each depend on within its own MA.

The IPC protocol allows for the dynamic addition of any IPC conforming MA into the IPC link for communication. Thus, an IPC network is formed without any compile time dependencies, or any other software assumptions. The IPC of the present invention presents a standard way for software components to communicate with the IPC stack and the hardware below the stack is also abstracted such that components can choose different links to communicate.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. An interprocessor communication (IPC) network, comprising:
a first processor acting as an IPC server; and
a second processor acting as an IPC client coupled to the IPC server,
the IPC client and IPC server including an IPC stack each having:
a presentation manager;
a session manager coupled to the presentation manager;
a device interface coupled to the session manager; and
the IPC client uses the IPC stack to communicate with the IPC server;
wherein the IPC server and the IPC client can switch functions via negotiation to allow the IPC client to become the new IPC server;
wherein the IPC network includes multiple IPC clients and remaining IPC clients of the IPC network are instructed to change the Internet Protocol address of the IPC server if the IPC client becomes the new IPC server; and
wherein the IPC network allows any processor that adopts the IPC as its inter-processor communication stack to co-exist together and operate as if the two were actually running on the same processor core sharing a common operating system and memory.

2. An IPC network as defined in claim 1, wherein at least one component is coupled to the IPC client.

3. An IPC network as defined in claim 2, wherein the presentation manager is used to translate different data types between the at least one component.

4. An IPC network as defined in claim 2, wherein the session manager assigns component IDs for the at least one component.

5. An IPC network as defined in claim 4, wherein the component IDs assigned to the at least one component are dynamic and can be reassigned.

6. An IPC network as defined in claim 4, wherein the session manager routes IPC data between the at least one component.

7. An IPC network as defined in claim 2, wherein the session manager further comprises an IPC router block having a component routing table, the component routing table is used by the session manger to send IPC data to one or more component(s) amongst the at least one component that that are linked to a particular opcode.

8. An IPC network as defined in claim 1, wherein at least one IPC hardware is coupled to the device interface and the device interface abstracts the at least one IPC hardware so that the IPC stack becomes hardware independent.

9. An IPC network as defined in claim 7, wherein the session manager further comprises an IPC transport layer, the IPC transport layer provides cyclic redundancy checks to the IPC data and the routing function of the IPC transport layer is enabled only on the IPC server.

10. An IPC network as defined in claim 7, wherein the IPC component routing table includes a list of IPC opcodes and all of the at least one component that have subscribed to a particular IPC opcode.

11. An IPC network as defined in claim 7, wherein the IPC router block also includes a dynamic routing table that includes an IPC address assigned to the IPC client and a pointer to all IPC supported message opcodes.

12. An IPC network as defined in claim 9, wherein the device interface includes a channel resource table that links a channel ID to a list of physical channel IDs.

13. An IPC network as defined in claim 2, wherein the session manager further comprises an IPC router block having a component routing table that includes a list of unique IPC opcodes, each unique IPC opcode is assigned to each of the at least one component.

14. An IPC network as defined in claim 1, wherein the device interface provides a hardware port that functions as a device interface to the IPC client.

15. An IPC network as defined in claim 1, wherein
the session manager handles an assignment and authentication of the IPC client.

16. An IPC network as defined in claim 15, wherein the session manager includes a dynamic routing table having a list of node Identification numbers (IDs) and each node coupled to the IPC stack has a unique node ID assigned to it.

17. A method for providing InterProcessor Communications (IPC) between first and second processors of an IPC network, comprising the steps of:
having the first processor act as an IPC server and the second processor act as an IPC client;
providing communications between the IPC server and the IPC client via an IPC network that includes an IPC stack in each of the IPC server and the IPC client; and
negotiating between the IPC server and the IPC client to permit the IPC client to become the new IPC server;
wherein the IPC network includes multiple IPC clients and the method further comprises the step of instructing remaining IPC clients of the IPC network to change the Internet Protocol address of the IPC server if the IPC client becomes the new IPC server;
wherein the IPC stack in each of the IPC server and the IPC client includes:
a presentation manager;
a session manager coupled to the presentation manager; and
a device interface coupled to the session manager;
wherein the IPC allows any processor that adopts the IPC as its inter-processor communication stack to co-exist together and operate as if the two were actually running on the same processor core sharing a common operating system and memory.

18. A method as defined in claim 17, wherein the session manager in each of the IPC server and the IPC client includes a dynamic routing table, and the method includes the further step of:
using the dynamic routing table in each of the IPC server and IPC client to properly route data sent from the IPC client to the IPC server.

19. A method as defined in claim 17, wherein IPC stacks of the IPC server and IPC clients includes a session manager that has an IPC transport layer, the IPC transport layer provides cyclic redundancy checks to the IPC data and the method further comprises the step of enabling the routing function of the IPC transport layer only on the IPC server.

\* \* \* \* \*